US012164021B2

United States Patent
Liu et al.

(10) Patent No.: US 12,164,021 B2
(45) Date of Patent: Dec. 10, 2024

(54) VEHICLE USING FULL-VELOCITY DETERMINATION WITH RADAR

(71) Applicants: Ford Global Technologies, LLC, Dearborn, MI (US); Board of Trustees of Michigan State University, East Lansing, MI (US)

(72) Inventors: Xiaoming Liu, Okemos, MI (US); Daniel Morris, Okemos, MI (US); Yunfei Long, East Lansing, MI (US); Marcos Paul Gerardo Castro, Mountainview, CA (US); Punarjay Chakravarty, Campbell, CA (US); Praveen Narayanan, San Jose, CA (US)

(73) Assignees: Ford Global Technologies, LLC, Dearborn, MI (US); Board of Trustees of Michigan State University, East Lansing, MI (US)

( * ) Notice: Subject to any disclaimer, the term of this patent is extended or adjusted under 35 U.S.C. 154(b) by 588 days.

(21) Appl. No.: 17/384,010

(22) Filed: Jul. 23, 2021

(65) Prior Publication Data

US 2023/0023347 A1    Jan. 26, 2023

(51) Int. Cl.
*G01S 13/86* (2006.01)
*G01S 13/90* (2006.01)
(Continued)

(52) U.S. Cl.
CPC ........ *G01S 13/867* (2013.01); *G01S 13/9021* (2019.05); *G06N 3/08* (2013.01);
(Continued)

(58) Field of Classification Search
CPC   G06T 7/50; G06T 7/215; G06T 7/269; G06T 2207/10016; G06T 2207/10028;
(Continued)

(56) References Cited

U.S. PATENT DOCUMENTS 9,599,706 B2    3/2017 Zeng et al.
10,094,919 B2    10/2018 Levi et al.
(Continued)

OTHER PUBLICATIONS

Kulkarni et al. "Pixel level fusion techniques for SAR and optical images: A review" 2020, Information Fusion, vol. 59, pp. 13-29 (Year: 2020).*

*Primary Examiner* — Anne Marie Antonucci
*Assistant Examiner* — Jared C Bean
(74) *Attorney, Agent, or Firm* — Frank A. MacKenzie; Bejin Bieneman PLC (57) ABSTRACT

A computer includes a processor and a memory storing instructions executable by the processor to receive radar data including a radar pixel having a radial velocity from a radar; receive camera data including an image frame including camera pixels from a camera; map the radar pixel to the image frame; generate a region of the image frame surrounding the radar pixel; determine association scores for the respective camera pixels in the region; select a first camera pixel of the camera pixels from the region, the first camera pixel having a greatest association score of the association scores; and calculate a full velocity of the radar pixel using the radial velocity of the radar pixel and a first optical flow at the first camera pixel. The association scores indicate a likelihood that the respective camera pixels correspond to a same point in an environment as the radar pixel.

19 Claims, 5 Drawing Sheets

(51) Int. Cl.
*G06N 3/08* (2023.01)
*G06T 7/215* (2017.01)
*G06T 7/50* (2017.01)

(52) U.S. Cl.
CPC ............... *G06T 7/215* (2017.01); *G06T 7/50* (2017.01); *G06T 2207/10028* (2013.01); *G06T 2207/20081* (2013.01); *G06T 2207/20084* (2013.01); *G06T 2207/30252* (2013.01)

(58) Field of Classification Search
CPC . G06T 2207/10024; G06T 2207/20081; G06T 2207/30252; G06T 2207/30261; G06T 2207/20084; G01S 13/931; G01S 13/42; G01S 13/589; G01S 13/9021; G01S 13/867; G06N 3/08; G06N 3/0464; G06N 3/0455; G06N 3/09

See application file for complete search history.

(56) References Cited

U.S. PATENT DOCUMENTS

| | | | |
|---|---|---|---|
| 2016/0084956 A1* | 3/2016 | Stainvas Olshansky | ................... G01S 13/58 342/195 |
| 2016/0109566 A1* | 4/2016 | Liu | ........................ G01S 13/867 342/52 |
| 2019/0188862 A1* | 6/2019 | Natroshvili | ............ G06N 3/045 |
| 2020/0082547 A1 | 3/2020 | Xie et al. | |
| 2020/0182992 A1 | 6/2020 | Kellner et al. | |
| 2021/0012166 A1 | 1/2021 | Braley et al. | |
| 2024/0094399 A1* | 3/2024 | Pazhayampallil | .... B60W 10/18 |

\* cited by examiner

VEHICLE USING FULL-VELOCITY DETERMINATION WITH RADAR

BACKGROUND

Vehicles are typically equipped with one or more cameras and one or more radars. Cameras can detect electromagnetic radiation in some range of wavelengths. For example, cameras may detect visible light, infrared radiation, ultraviolet light, or some range of wavelengths including visible, infrared, and/or ultraviolet light. Radars transmit radio waves and receive reflections of those radio waves to detect physical objects in the environment. Radars can use direct propagation, i.e., measuring time delays between transmission and reception of radio waves, or indirect propagation, i.e., Frequency Modulated Continuous Wave (FMCW) method, i.e., measuring changes in frequency between transmitted and received radio waves.

DETAILED DESCRIPTION

Radars are equipped to return radial velocities of points in the environment relative to the radar but not full velocities. A full velocity is the speed and direction of travel of a point in the environment, e.g., a point on a moving object, either relative to the radar or to the environment. An absolute full velocity, i.e., a full velocity relative to the environment, can be determined by subtracting a velocity of a vehicle including the radar from the relative full velocity, i.e., a full velocity relative to the radar. A radial velocity of a point, in the context of radar data, is the component of full velocity along a line from the point to the radar. Radars can detect radial velocities of points in the environment by taking advantage of the Doppler effect. The full velocity of a point is the sum of the radial velocity and the tangential velocity of the point. A tangential velocity of a point, in the context of radar data, is the component of full velocity in a plane that contains the point and is orthogonal to the line from the point to the radar. Radars are not equipped to provide direct measurement of tangential velocities.

The systems and methods described herein provide pointwise determination of the full velocity of points detected by a radar. In other words, the system determines the full velocity for each radar pixel of the radar data. The system provides full velocities by using data from the radar and data from a camera. The system uses a closed-form calculation for the full velocities, meaning that the full velocities can be provided reliably and with low computational effort. Moreover, the system provides an accurate association between the radar data and the camera data. The association between the radar data and the camera data provides accurate inputs to the closed-form calculation, ensuring that the outputted full velocities are also accurate. A vehicle including the radar can use the full velocities for operating autonomously or semi-autonomously.

A computer includes a processor and a memory storing instructions executable by the processor to receive radar data from a radar, the radar data including a radar pixel having a radial velocity; receive camera data from a camera, the camera data including an image frame including camera pixels; map the radar pixel to the image frame; generate a region of the image frame surrounding the radar pixel; determine association scores for the respective camera pixels in the region, the association scores indicating a likelihood that the respective camera pixels correspond to a same point in an environment as the radar pixel; select a first camera pixel of the camera pixels from the region, the first camera pixel having a greatest association score of the association scores; and calculate a full velocity of the radar pixel using the radial velocity of the radar pixel and a first optical flow at the first camera pixel.

The instructions may further include instructions to operate a vehicle including the radar and the camera based on the full velocity.

Mapping the radar pixel to the image frame may include applying a geometric transformation to the radar pixel.

Determining the association scores may include executing a trained network. Inputs to the trained network may include the radar data, the image frame, and optical flow of the image frame. The radar data may be accumulated over a time interval.

The trained network may be a convolutional neural network.

The trained network may be an encoder-decoder network.

The trained network may be trained by minimizing an error between a ground-truth velocity of the radar pixel and projected full velocities of the radar pixel using the respective camera pixels. Each projected full velocity may be calculated using the radial velocity of the radar pixel and a respective optical flow at the respective camera pixel.

The image frame may be a first image frame, the camera data may include a second image frame, and the first optical flow may represent shifting between the first image frame at the first camera pixel and the second image frame.

The region may have a preset position in the image frame relative to the radar pixel. The region may be a preset shape in the image frame, and the preset shape may have a greater height than width.

The region may be a preset shape in the image frame, and the preset shape may extend a greater distance vertically upward than downward from the radar pixel.

The instructions may further include instructions to, upon the greatest association score being below a threshold association score, refrain from calculating the full velocity of the radar pixel.

Calculating the full velocity of the radar pixel may be performing a closed-form calculation.

The full velocity of the radar pixel may be calculated using only the radar data and the camera data.

The first camera pixel may be at an updated location in the image frame from a location to which the radar pixel was mapped in the image frame.

The radar data may be single-row data, and the radar data may be sparser horizontally than the camera data are.

A method includes receiving radar data from a radar, the radar data including a radar pixel having a radial velocity; receiving camera data from a camera, the camera data including an image frame including camera pixels; mapping the radar pixel to the image frame; generating a region of the image frame surrounding the radar pixel; determining association scores for the respective camera pixels in the region, the association scores indicating a likelihood that the respective camera pixels correspond to a same point in an environment as the radar pixel; selecting a first camera pixel of the camera pixels from the region, the first camera pixel having a greatest association score of the association scores; and calculating a full velocity of the radar pixel using the radial velocity of the radar pixel and a first optical flow at the first camera pixel.

With reference to the Figures, wherein like numerals indicate like parts throughout the several views, a computer 102 for a vehicle 100 includes a processor and a memory storing instructions executable by the processor to receive radar data from a radar 114, the radar data including a radar pixel 116 having a radial velocity; receive camera data from a camera 112, the camera data including an image frame 118 including camera pixels 120; map the radar pixel 116 to the image frame 118; generate a region 122 of the image frame 118 surrounding the radar pixel 116; determine association scores for the respective camera pixels 120 in the region 122; select a first camera pixel 120 of the camera pixels 120 from the region 122, the first camera pixel 120 having a greatest association score of the association scores; and calculate a full velocity of the radar pixel 116 using the radial velocity of the radar pixel 116 and a first optical flow at the first camera pixel 120. The association scores indicate a likelihood that the respective camera pixels 120 correspond to a same point in an environment as the radar pixel 116.

Figure 1:
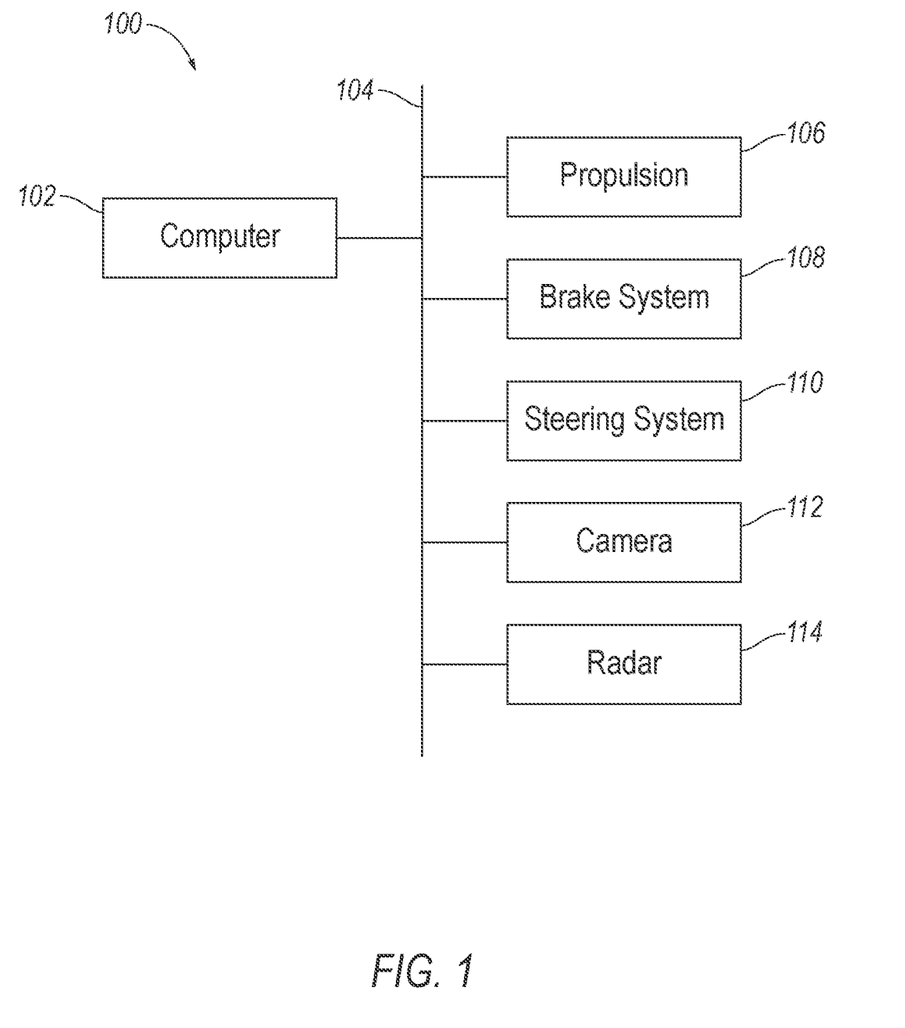
FIG. 1 is a block diagram of an example vehicle with a radar and a camera.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous or semi-autonomous vehicle. The computer 102 can be programmed to operate the vehicle 100 independently of the intervention of a human operator, completely or to a lesser degree. The computer 102 may be programmed to operate a propulsion 106, a brake system 108, a steering system 110, and/or other vehicle systems based on data from the camera 112 and radar 114, as well as other sensors. For the purposes of this disclosure, autonomous operation means the computer 102 controls the propulsion 106, brake system 108, and steering system 110 without input from a human operator; semi-autonomous operation means the computer 102 controls one or two of the propulsion 106, brake system 108, and steering system 110 and a human operator controls the remainder; and nonautonomous operation means a human operator controls the propulsion 106, brake system 108, and steering system 110.

The computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 104 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the camera 112, the radar 114, the propulsion 106, the brake system 108, the steering system 110, and other components via the communications network 104.

The propulsion 106 of the vehicle 100 generates energy and translates the energy into motion of the vehicle 100. The propulsion 106 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 106 can include an electronic control unit (ECU) or the like that is in communication with and receives input from the computer 102 and/or a human operator. The human operator may control the propulsion 106 via, e.g., an accelerator pedal and/or a gear-shift lever.

The brake system 108 is typically a conventional vehicle braking subsystem and resists the motion of the vehicle 100 to thereby slow and/or stop the vehicle 100. The brake system 108 may include friction brakes such as disc brakes, drum brakes, band brakes, etc.; regenerative brakes; any other suitable type of brakes; or a combination. The brake system 108 can include an electronic control unit (ECU) or the like that is in communication with and receives input from the computer 102 and/or a human operator. The human operator may control the brake system 108 via, e.g., a brake pedal.

The steering system 110 is typically a conventional vehicle steering subsystem and controls the turning of the wheels. The steering system 110 may be a rack-and-pinion system with electric power-assisted steering, a steer-by-wire system, as both are known, or any other suitable system. The steering system 110 can include an electronic control unit (ECU) or the like that is in communication with and receives input from the computer 102 and/or a human operator. The human operator may control the steering system 110 via, e.g., a steering wheel.

The camera 112 detects electromagnetic radiation in some range of wavelengths. For example, the camera 112 may detect visible light, infrared radiation, ultraviolet light, or some range of wavelengths including visible, infrared, and/or ultraviolet light. For example, the camera 112 can be a charge-coupled device (CCD), complementary metal oxide semiconductor (CMOS), or any other suitable type.

The radar 114 transmits radio waves and receives reflections of those radio waves to detect physical objects in the environment. The radar 114 can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves.

Figure 2:
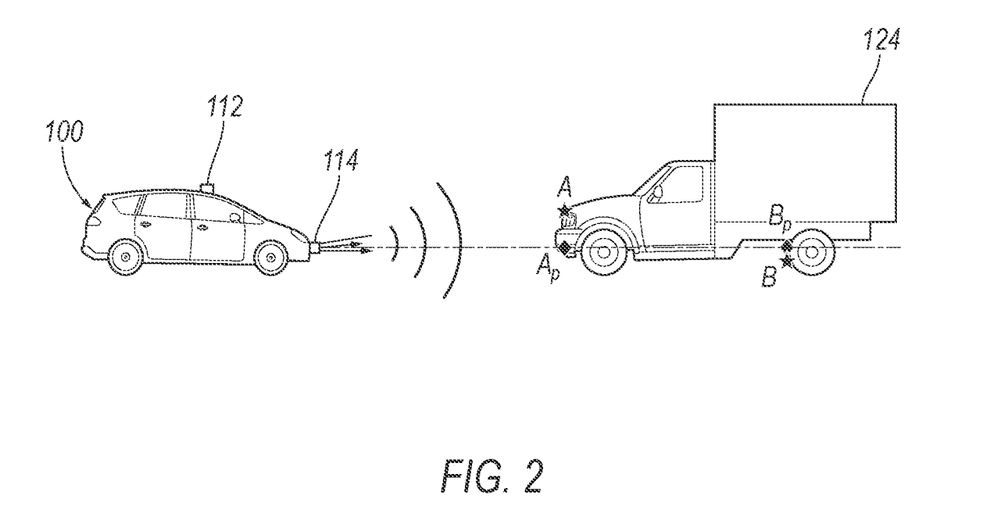
FIG. 2 is a diagrammatic side view of the vehicle and an example object detected by the radar and the camera.

With reference to FIG. 2, the camera 112 and the radar 114 can be fixed relative to each other, specifically have fixed positions and orientations relative to each other. For example, the camera 112 can be mounted higher and farther rearward than the radar 114. The camera 112 can be mounted on a roof of the vehicle 100, or on a ceiling of the vehicle 100 inside a windshield. The radar 114 can be mounted to a front bumper of the vehicle 100. The camera 112 and the radar 114 can instead be fixed to other locations of the vehicle 100. The camera 112 and the radar 114 are oriented so that their fields of view overlap. For example, the camera 112 and the radar 114 can both be oriented in a vehicle-forward direction.

Figure 3:
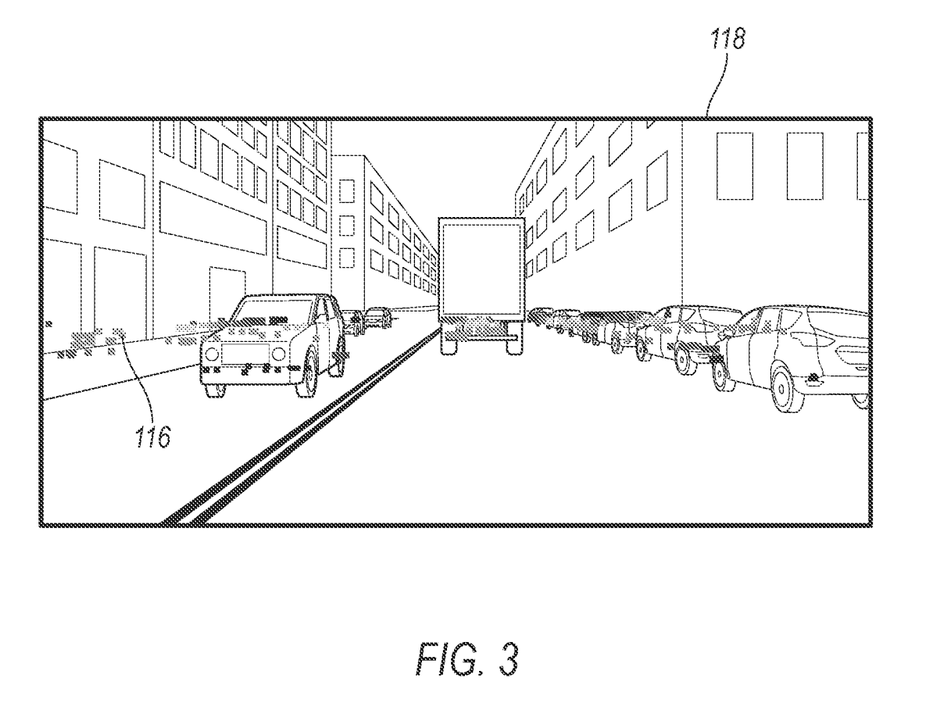
FIG. 3 is an example image frame from the camera with radar pixels from the radar mapped onto the image frame.

With reference to FIG. 3, the camera 112 generates the camera data. The camera data are a plurality, i.e., a sequence of image frames 118 of the field of view of the camera 112. Each image frame 118 is a two-dimensional matrix including camera pixels 120. (In FIG. 4, the camera pixels 120 are shown only in the upper left corners of the image frame 118 and one of the regions 122 because it would be impractical to show them all, but the camera pixels 120 extend across an entirety of the image frame 118.) Each camera pixel 120 has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The camera pixels 120 may be a mix of representations, e.g., a repeating pattern of scalar values of intensity for three camera pixels 120 and a fourth camera pixel 120 with three numerical color values, or some other pattern. Position in an image frame 118, i.e., position in the field of view of the camera 112 at the time that the image frame 118 was recorded, can be specified in pixel dimensions or coordinates, e.g., an ordered pair of pixel distances, such as a number of camera pixels 120 from a top edge and a number of camera pixels 120 from a left edge of the image frame 118.

The camera data can include data about optical flow. The optical flow describes a scene shift, i.e., differences in pixel coordinates corresponding to respective points in space, between the image frame 118 taken as input, which will be referred to as a first image frame 118, and a second image frame 118. The second image frame 118 can be from a different, nearby point in time from the first image frame 118. The second image frame 118 can be from before or after the first image frame 118. For example, for a target observed in the first and second image frames 118, the optical flow gives a mapping from the pixel coordinates in the earlier of the two image frames 118 to the pixel coordinates in the later of the two image frames 118, e.g., Flow$((i_1, j_1)) \rightarrow (i_2, j_2)$. The optical flow can be determined using known image-processing techniques for scene flow for images.

The radar 114 can generates the radar data. The radar data can include a plurality of radar pixels 116. (In FIG. 3, only one exemplary radar pixel 116 is labeled with a reference number because it would be impractical to label them all, but all the grayscale squares are radar pixels 116.) The radar pixels 116 can specify respective positions in the environment relative to the position of the radar 114. For example, the radar data can be in spherical coordinates with the radar 114 at the origin of the spherical coordinate system. The spherical coordinates can include a radial distance, i.e., a measured depth from the radar 114 to the point measured by the radar 114; a polar angle, i.e., an angle from a vertical axis through the radar 114 to the point measured by the radar 114; and an azimuthal angle, i.e., an angle in a horizontal plane from a horizontal axis through the radar 114 to the point measured by the radar 114. The horizontal axis can be, e.g., along a vehicle-forward direction. Alternatively, the radar 114 can return the radar pixels 116 as Cartesian coordinates with the radar 114 at the origin or as coordinates in any other suitable coordinate system, or the computer 102 can convert the spherical coordinates to Cartesian coordinates or another coordinate system after receiving the radar data. The radar pixels 116 can also include a radial velocity for each radar pixel 116, i.e., a component of the velocity of the point measured by the radar 114 toward or away from the radar 114.

The radar data can be single-row data, i.e., the radar pixels 116 can be arranged in a horizontal sequence and not vertically stacked. Even if the radar pixels 116 are arranged in a single row, the radar pixels 116 can be at different heights or polar angles, as seen in FIG. 3. (FIG. 3 shows the radar pixels 116 that have accumulated over a time interval.) The radar pixels 116 are typically sparser than the camera pixels 120. For example, the radar pixels 116 can be a single row rather than multiple rows like the camera pixels 120, and the radar pixels 116 can be sparser horizontally than the camera pixels 120 are.

FIG. 3 shows the radar pixels 116 after being mapped to the image frame 118. For example, the computer 102 can map the radar pixels 116 to the image frame 118 by first applying a known geometric transformation from the reference frame of the radar 114 to the reference frame of the camera 112:

$$^{C}q = {_R^C}T\,^{R}q$$

in which q is a 4-element vector ($x_q$, $y_q$, $z_q$, 1) representing a point in the environment, the left superscript C indicates the reference frame of the camera 112, the left superscript R represents the reference frame of the radar 114, and $_R^C T$ is a 4×4 transformation matrix from the reference frame R of the radar 114 to the reference frame C of the camera 112. The transformation matrix $_R^C T$ can be known in advance based on the relative positions of the camera 112 and the radar 114 and is stored in the computer 102. The vector q can be represented in Cartesian coordinates in which, relative to the direction that the camera 112 or radar 114 is oriented, the X-axis extends leftward, the Y-axis extends upward, and the Z-axis extends forward, i.e., the depth is measured along the Z-axis. The first two elements of the vector $^{C}q$, i.e., the vertical and lateral components of the vector $^{C}q$ relative to the direction in which the camera 112 is oriented, can be shifted and/or scaled by known constants to arrive at the pixel coordinates (i, j) of the radar pixel 116. The constants for the shifting and/or scaling can be based on the physical properties of the camera 112.

Returning to FIG. 2, mapping the radar pixels 116 to the image frame 118 using the transformation matrix can result in the radar pixels 116 being located at camera pixels 120 corresponding points different than the points detected by the radar pixels 116. For example, a radar pixel 116 can correspond to a point corresponding to camera pixels 120 with a different location than the radar pixel 116 is mapped to in the image frame 118. For another example, a radar pixel 116 can correspond to a point that does not correspond to any of the camera pixels 120 in the image frame 118, e.g., if the radar pixel 116 is of an object occluded from the image frame 118. In the example of FIG. 2, the radar 114 can detect points A and B, shown in FIG. 2, on another vehicle 124. The radar pixels 116 corresponding to points A and B are mapped using the transformation matrix to camera pixels 120 corresponding to points $A_p$ and $B_p$. The points A and $A_p$ are both visible to the camera 112 but have different pixel coordinates. The points B and $B_p$ are not visible to the camera 112, in other words, are occluded.

Figure 4:
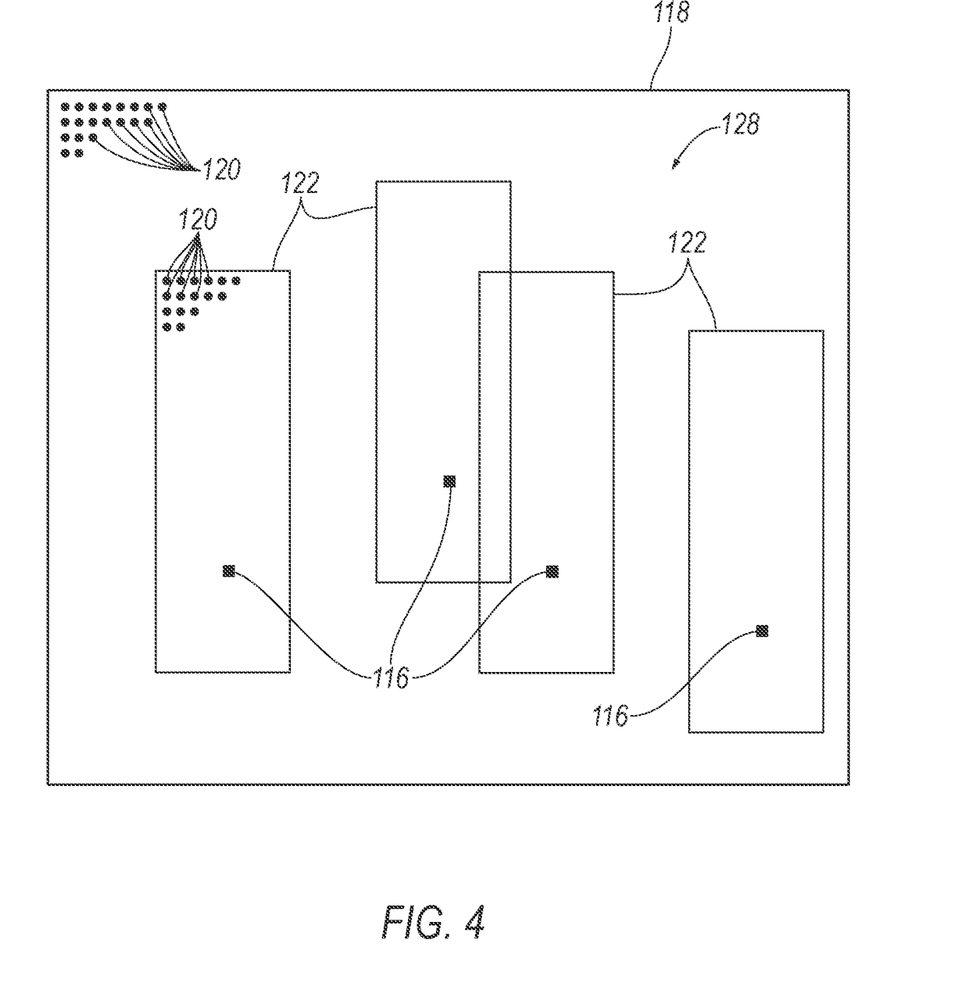
FIG. 4 is a diagram of example regions surrounding the radar pixels in the image frame.

With reference to FIG. 4, after mapping the radar pixels 116 to the image frame 118, the computer 102 can generate regions 122 of the image frame 118 surrounding the respective radar pixels 116, e.g., one region 122 for each radar pixel 116. Each region 122 is a contiguous subset of the image frame 118. Each region 122 can have a preset position and preset shape relative to the respective radar pixel 116. The preset position of the region 122 can include the radar pixel 116 within the region 122, e.g., can be horizontally centered on the radar pixel 116. The preset shape relative to the radar pixel 116 can have a greater height than width, which accounts for the radar data having a greater vertical sparsity, e.g., by being a single row. The preset shape can extend a greater distance vertically upward than downward from the respective radar pixel 116, which accounts for objects of interest potentially being a greater distance above a height of the radar 114 than below the height of the radar 114, in part because the objects generally cannot be below the ground on which the vehicle 100 is traveling. For example, the preset shape can be an h×w rectangle, in which h is a vertical distance in units of camera pixels 120 along the image frame 118 and w is a horizontal distance in units of camera pixels 120 along the image frame 118, with h>w. Relative to the respective radar pixel 116, the preset shape of the region 122 can extend a distance w/2 to the left and to the right of the radar pixel 116, and the preset shape can extend a distance $h_{up}$ above the radar pixel 116 and a distance $h_{down}$ below the radar pixel 116, with $h_{up}+h_{down}=h$ and $h_{up}>h_{down}$.

The computer 102 can determine an association score for each camera pixel 120 in a given region 122. The association scores indicate a likelihood that the respective camera pixel 120 corresponds to a same point in the environment as the radar pixel 116 for that region 122. The association score can be represented as a function A(i, j, k), in which (i, j) are the pixel coordinates of the radar pixel 116 and k is an index of the camera pixels 120 in the region 122 surrounding that radar pixel 116. The index k of the camera pixels 120 can have a range [1, . . . N], in which N is the total number of camera pixels 120 in a region 122, e.g., N=hw for the rectangular preset shape for the regions 122 shown in FIG. 4. As will now be described, determining the association scores includes executing a trained network, e.g., a neural network or other machine-learning program.

The trained network takes inputs from the camera data and the radar data. The inputs to the trained network can include the radar data, the image frame 118, and the optical flow of the image frame 118, as all described above. The image frame 118 and the optical flow can be taken at a point in time, and the radar data can be accumulated over a time interval including the point in time. The time interval can be chosen to be short while providing sufficient radar data for the trained network to achieve accurate results, e.g., 0.3 seconds. The radar data can be transformed to the point in time of the image frame 118 using the motion of the vehicle 100 and/or the radial velocities from the radar data, in order to compensate for the motion of the vehicle 100 and of objects in the environment. The accumulation of the radar data over the time interval can compensate for the relative sparsity of the radar data compared to the camera data.

The trained network can output the association scores A(i, j, k). Running the trained network can determine the association scores A(i, j, k) for all N camera pixels 120 in one of the regions 122. The association score of the kth camera pixel 120 in a region 122 indicates a likelihood that the kth camera pixel 120 corresponds to a same point in the environment as the radar pixel 116 for that region 122. The greater the association score for the kth camera pixel 120, the more likely that the kth camera pixel 120 is the most accurate camera pixel 120 to select from the region 122 to correspond to the radar pixel 116 for that region 122.

The combination of inputs can be used for generating the confidence scores A(i, j, k). The image frame 118 can provide scene context for each radar pixel 116, as well as boundary information for objects. The optical flow can provide additional boundary information. The radar pixels 116 can provide depth for interpreting the context of the image frame 118 and a basis for predicting the depth of nearby camera pixels 120.

The trained network can be any suitable type of network for converting the inputs to the outputted association scores A(i, j, k). For example, the trained network can be a convolutional neural network, which is well suited to analyzing visual imagery. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network can output the association scores A(i, j, k) for the camera pixels 120 in the region 122 of interest. Alternatively or additionally, the trained network can be an encoder-decoder network, e.g., with skip connections. Encoder-decoder networks with skip connections typically perform well at image segmentation and are thus well suited to using the camera data to assign the association scores A(i, j, k) to particular camera pixels 120.

The trained network can be trained on a training set including camera data, radar data, and ground-truth full velocities corresponding to the camera data and radar data. For example, the training set can include LIDAR data paired with the camera data and radar data, and the LIDAR data can be used as ground truth. The LIDAR data can be accumulated over a short time interval to increase the density of the depths returned by the LIDAR data, which can result in a more accurate trained network. The LIDAR data can also be processed in other ways to form the training set, such as using the scene flow of LIDAR points, semantic segmentation, and/or 3D bounding boxes to remove LIDAR points that are occluded from the camera data in the training set. These types of processing can make the LIDAR data more accurate. The ground-truth full velocities can be determined using the bounding boxes, e.g., by comparing positions of bounding boxes of the same instance in neighboring times. A bounding box can be assigned to a radar pixel 116 based on a distance between the bounding box and the radar pixel 116 and/or an error between the radial velocity of the radar pixel 116 and the radial component of the full velocity of the bounding box.

The trained network can be trained on the training set by minimizing an error between a ground-truth velocity $^A\dot{m}_{GT}$(i, j) of the radar pixel 116 and projected full velocities $^A\dot{m}_{est}$(i, j, k) of the radar pixel 116 using the camera pixels 120 in the region 122, in which the left superscript A indicates the reference frame of the camera 112, $\dot{m}$ is the full velocity of the point detected by the radar 114 corresponding to the radar pixel 116, the subscript GT indicates ground truth, the subscript est indicates that the full velocity is projected, i.e., estimated or predicted, (i, j) are the pixel coordinates of the radar pixel 116 according to the mapping to the image frame 118 described above, and k is the index of the camera pixels 120 in the region 122 surrounding the radar pixel 116. The projected full velocities $^A\dot{m}_{est}(i, j, k)$ can be determined using the closed-form solution for calculating the full velocities described below, applied to each camera pixel 120 in the region 122. Each projected full velocity can be calculated using the radial velocity $\dot{r}$ of the radar pixel 116 and a respective optical flow at the respective camera pixel 120, in the manner described below. The error between the ground-truth velocity $^A\dot{m}_{GT}(i, j)$ of the radar pixel 116 and the projected full velocities $^A\dot{m}_{est}(i, j, k)$ can be an $L_2$ norm of errors:

$$E_v(i,j,k) = \|^A\dot{m}_{est}(i,j,k) - ^A\dot{m}_{GT}(i,j)\|$$

To minimize the error, the $L_2$ norm can be transformed to a label indicating an association probability:

$$L(i, j, k) = e^{-\frac{E_v^2(i,j,k)}{c}}$$

in which c is a parameter adjusting the tolerance of velocity errors when converting errors to associations. The parameter c can be chosen to minimize the effect of artifacts when training the trained network. The loss function for minimizing the error can be the weighted binary cross-entropy loss between the labels L(i, j, k) and the network output A(i, j, k):

$$L_{CE} = \sum_{i,j,k} \left[ -L(i, j, k)A(i, j, k) + \log\left(1 + e^{A(i,j,k)}\right) \right]$$

After using the trained network to determine the association scores A(i, j, k) for the camera pixels 120 in the region 122 of a given radar pixel 116, the computer 102 can select a first camera pixel 120 of the camera pixels 120 from the region 122. The first camera pixel 120 has a greatest association score $A_{max}(i, j, k)$ of the association scores A(i, j, k):

$$k_{max} = \underset{k}{\mathrm{argmax}}(A(i, j, k))$$

in which $k_{max}$ is the index of the first camera pixel 120 and argmax( ) is a function returning the argument of a function that maximizes the function. The first camera pixel 120, i.e., the camera pixel 120 with index $k_{max}$, is at an updated location ($i_{kmax}$, $j_{kmax}$) in the image frame 118 from the location (i, j) to which the radar pixel 116 was mapped in the image frame 118, as described above. The updated location ($i_{kmax}$, $j_{kmax}$) is likely different than the mapped location (i, j), as described for the example of FIG. 2. The association scores A(i, j, k) from the trained network can thus provide more accurate pixel coordinates at which to calculate the full velocity than using the mapped location (i, j).

The computer 102 may use only first camera pixels 120 $k_{max}$ with association scores $A_{max}(i, j, k)$ greater than a threshold association score $A_{th}$. The threshold association score $A_{th}$ can be chosen to indicate an occlusion, i.e., that the radar pixel 116 corresponds to a point not visible to the camera 112. Upon the greatest association score $A_{max}(i, j, k)$ being below the threshold association score, i.e., $A_{max}(i, j, k) < A_{th}$, the computer 102 may refrain from calculating the full velocity of the radar pixel 116. In other words, the computer 102 may only determine the full velocities for the radar pixels 116 that are unlikely to be occluded.

Figure 5:
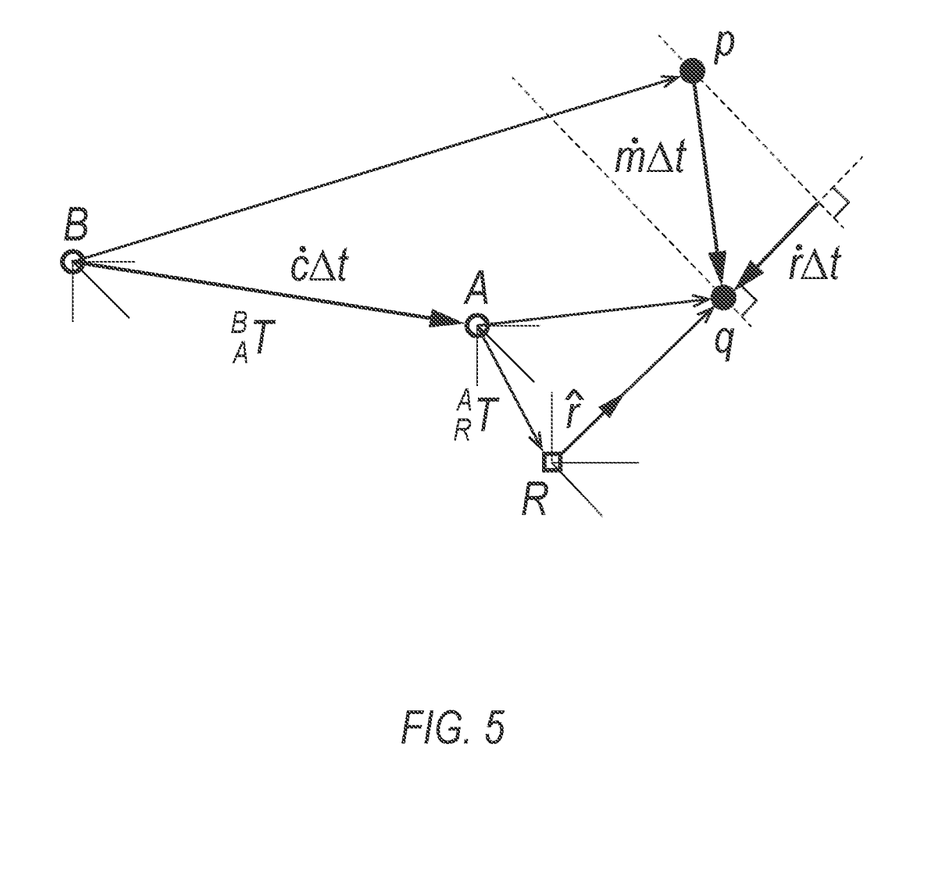
FIG. 5 is a diagram of example motion by a point detected by the camera and the radar.

With reference to FIG. 5, the calculation of the full velocity using the first camera pixel 120 will now be described. FIG. 5 diagrams the notation for calculating the full velocity of a point. The reference frame A is the position of the camera 112 in space at a time t for which the calculation will be performed. The reference frame B is the position of the camera 112 in space at an earlier time t-Δt (or a later time if Δt is negative). The reference frame R is the position of the radar 114 in space at the time t. The point q is the point of interest in space detected by the radar 114 at the radar pixel 116 of interest at the time t. The point p is the same point in space at the earlier time t-Δt, before an object containing the point moved during the time interval Δt. The distance vector cΔt is the change in position of the camera 112 from the reference frame A to the reference frame B over the time interval Δt, and the distance vector ṁΔt is the change in position of the point from p to q over the time interval Δt. The velocity vector c is the velocity of the camera 112 at the time t. The velocity vector ṁ is the full velocity of the point at the time t. The radial distance vector ṙΔt is the component of the distance vector ṁΔt along the direction from the radar 114 to the point at the time t, and the radial velocity vector r is the component of the velocity vector ṁ along the direction from the radar 114 to the point at the time t. The 4×4 transformation matrix $_A^B T$ is a conversion of a position from the reference frame B to the reference frame A. The 3×3 rotation matrix $_A^B R$ is a rotation of a velocity from the reference frame B to the reference frame A. The 3×3 rotation matrix $_R^A R$ is a rotation of a velocity from the reference frame A to the reference frame R.

Here are the known values that will be used in the calculation. The pixel coordinates in the image frame 118 for the point $^A q$ in the reference frame A are the pixel coordinates ($i_{kmax}$, $j_{kmax}$) of the first camera pixel 120 selected above, i.e., the updated location for the radar pixel 116, which will hereafter be represented as ($u_q$, $v_q$). The pixel coordinates ($u_p$, $v_p$) in the image frame 118 for the point $^B p$ in the reference frame B can be known from a first optical flow, which is the optical flow measured at the first camera pixel 120 ($u_q$, $v_q$). The spatial vectors for $^A q$ and $^B p$ can be represented in unit focal plane coordinates as ($u_q d_q$, $v_q d_q$, $d_q$, 1)T and ($u_p d_p$, $v_p d_p$, $d_p$, 1)T respectively. The depth $d_q$ is known as the depth for the radar pixel 116 from the radar data, and the depth $d_p$ is not known in advance. The transformation matrix $_A^B T$ and the rotation matrix $_A^B R$ can be known based on the motion of the vehicle 100 from the earlier time t−Δt to the time t. The transformation matrix $_R^A T$ and the rotation matrix $_R^A R$ can be known in advance based on the relative positions and orientations of the camera 112 and the radar 114 and can be stored in the computer 102.

The computer 102 calculates the full velocity of the radar pixel 116 by performing a closed-form calculation. A "closed-form" calculation is one that finishes in a finite number of steps using a finite number of standard operations excluding limits, differentiation, integration, and numerical approximation. The closed-form calculation can be derived from this relationship:

$$^B p_{1:3} = ^B q_{1:3} - _A^B R /\!\wedge \dot{m} \Delta t$$

in which $^A \dot{m}$ is the full velocity in the reference frame A, and the subscripts 1:3 indicate the first three elements of the vector, e.g., $^B p_{1:3} = (u_p d_p, v_p d_p, d_p)^T$. To arrive at the closed-form calculation, the relationship above can be rearranged by using the third row to substitute for the unknown depth $d_p$ in the first two rows and adding a new third row based on the relationship $\dot{r}=\hat{r}^T \dot{m}$, in which $\hat{r}$ is the unit-norm vector along the direction of $^Rq$, i.e., along the direction from the radar 114 to the point at the time t. The radial velocity $\dot{r}$ can be corrected for ego motion, i.e., for motion of the vehicle 100 and thus of the radar 114. This is the resulting calculation for the full velocity:

$$^A\dot{m} = \begin{bmatrix} ^B_A R_1 - u_p {}^B_A R_3 \\ ^B_A R_2 - v_p {}^B_A R_3 \\ ^A\hat{r}^T \end{bmatrix}^{-1} \begin{bmatrix} (^Bq_1 - u_p {}^Bq_3)/\Delta t \\ (^Bq_2 - u_p {}^Bq_3)/\Delta t \\ \dot{r} \end{bmatrix}$$

in which the subscripts 1, 2, and 3 indicate the first, second, and third rows respectively of a matrix or vector. The solution as shown is an inverse of a 3×3 matrix multiplied by a 3×1 vector, resulting a 3×1 vector for the full velocity $^A\dot{m}$. The values in the first two rows of the matrices can be known from the image frame 118 and from the optical flow, and the third row can be known from the radial velocity. The solution could instead be formulated using an uncorrected radial velocity $\dot{r}_{raw}=\hat{r}^T(\dot{m}-\hat{c})$ rather than the corrected radial velocity $\dot{r}$. The solution can provide a simple calculation for the full velocity using only the radar data and the camera data.

Figure 6:
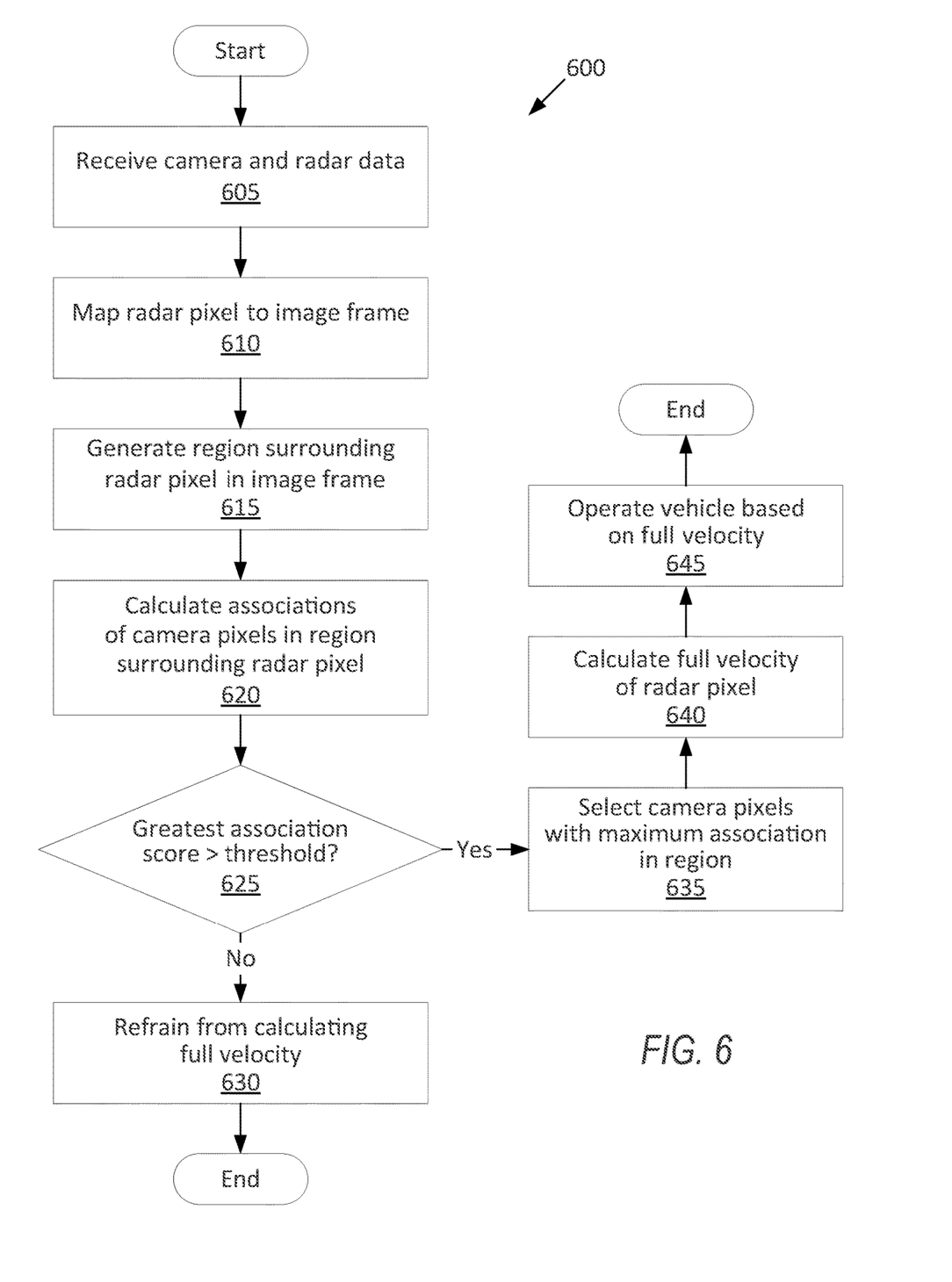
FIG. 6 is a process flow diagram of an example process for determining full velocities of the radar pixels and operating the vehicle based on data from the camera and the radar.

FIG. 6 is a process flow diagram illustrating an exemplary process 600 for determining the full velocities of the radar pixels 116 and operating the vehicle 100 based on the radar data and the camera data. The memory of the computer 102 stores executable instructions for performing the steps of the process 600 and/or programming can be implemented in structures such as mentioned above. The computer 102 can execute the process 600 continuously while the vehicle 100 is on, e.g., once for each radar pixel 116 at each time step. As a general overview of the process 600, the computer 102 receives the camera data and the radar data, maps the radar pixel 116 to the image frame 118, generates the region 122 surrounding the radar pixel 116 in the image frame 118, determines the association scores A(i, j, k) of the camera pixels 120 in the region 122, and determines whether the greatest association score A(i, j, k) is greater than the threshold association score $A_{th}$. If the greatest association score $A_{max}$(i, j, k) is below the threshold association score $A_{th}$, the computer 102 refrains from calculating the full velocity $^A\dot{m}$ for that region 122. If the greatest association score $A_{max}$(i, j, k) is above the threshold association score $A_{th}$, the computer 102 selects the first camera pixel 120, calculates the full velocity $^A\dot{m}$ of the radar pixel 116, and operates the vehicle 100 based on the full velocity $^A\dot{m}$.

The process 600 begins in a block 605, in which the computer 102 receives the camera data from the camera 112 and the radar data from the radar 114. The radar data can include the radar pixels 116 having measured depths and the radial velocities, as described above. The camera data can include the image frame 118 including the camera pixels 120, as described above.

Next, in a block 610, the computer 102 maps the radar pixel 116 to the image frame 118, e.g., using the transformation matrix $_R^CT$ as described above.

Next, in a block 615, the computer 102 generates the regions 122 of the image frame 118 surrounding the respective radar pixels 116, as described above and shown in FIG. 4.

Next, in a block 620, the computer 102 determines the association scores A(i, j, k) for the camera pixels 120 in the regions 122 by executing the trained network, as described above.

Next, in a decision block 625, the computer 102 determines whether the greatest association score $A_{max}$(i, j, k) of the association scores A(i, j, k) is greater than the threshold association score $A_{th}$. Upon the greatest association score $A_{max}$(i, j, k) being below the threshold association score $A_{th}$, the process 600 proceeds to a block 630. Upon the greatest association score $A_{max}$ (i, j, k) being above the threshold association score $A_{th}$, the process 600 proceeds to a block 635.

In the block 630, the computer 102 refrains from calculating the full velocity $^A\dot{m}$ of the radar pixel 116. After the block 630, the process 600 ends.

In the block 635, the computer 102 selects the first camera pixel 120, i.e., the camera pixel 120 having the greatest association score $A_{max}$(i, j, k) of the association scores A(i, j, k).

Next, in a block 640, the computer 102 calculates the full velocity $^A$n of the radar pixel 116 using the radial velocity of the radar pixel 116 and the first optical flow at the first camera pixel 120, using the closed-form calculation described above.

Next, in a block 645, the computer 102 operates the vehicle 100 based on the full velocity $^A\dot{m}$ (along with the other full velocities $^A\dot{m}$ determined by executing the process 600 continuously). For example, the computer 102 can actuate at least one of the propulsion 106, the brake system 108, or the steering system 110. For example, the computer 102 may actuate the brake system 108 based on the full velocity $^A\dot{m}$ as part of an automatic-braking feature, e.g., braking to prevent the vehicle 100 from contacting an object in the environment that is moving in front of the vehicle 100. For another example, the computer 102 may operate the vehicle 100 autonomously, i.e., actuating the propulsion 106, the brake system 108, and the steering system 110 based on the full velocity $^A\dot{m}$, e.g., to navigate the vehicle 100 around moving objects in the environment. After the block 645, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
    receive radar data from a radar, the radar data including a plurality of radar pixels having respective radial velocities;
    receive camera data from a camera, the camera data including an image frame including camera pixels;
    map the radar pixels to the image frame;
    for the respective radar pixels mapped to the image frame, generate a region of the image frame surrounding the respective radar pixel;
    for the respective regions, determine association scores for the respective camera pixels in the respective region, the association scores indicating a likelihood that the respective camera pixels correspond to a same point in an environment as the respective radar pixel, wherein determining the association scores includes executing a trained network;
    for the respective regions, select a first camera pixel of the camera pixels from the respective region, the first camera pixel having a greatest association score of the association scores in the respective region;
    and for the respective regions, calculate a full velocity of the respective radar pixel using the radial velocity of the respective radar pixel and a first optical flow at the respective first camera pixel, the full velocity being a combination of the radial velocity and a tangential velocity of the point in the environment;
    wherein the trained network is trained by, for the respective radar pixels mapped to the image frame, minimizing an error between a ground-truth velocity of the respective radar pixel and projected full velocities of the respective radar pixel using the respective camera pixels.

2. The computer of claim 1, wherein the instructions further control a vehicle including the radar and the camera based on the full velocities.

3. The computer of claim 1, wherein mapping the radar pixels to the image frame includes applying a geometric transformation to the radar pixels.

4. The computer of claim 1, wherein inputs to the trained network include the radar data, the image frame, and optical flow of the image frame.

5. The computer of claim 4, wherein the radar data are accumulated over a time interval.

6. The computer of claim 1, wherein the trained network is a convolutional neural network.

7. The computer of claim 1, wherein the trained network is an encoder-decoder network.

8. The computer of claim 1, wherein each projected full velocity is calculated using the radial velocity of the respective radar pixel and a respective optical flow at the respective camera pixel.

9. The computer of claim 1, wherein the image frame is a first image frame, the camera data include a second image frame, and the first optical flow for each first camera pixel represents shifting between the first image frame at the first camera pixel and the second image frame.

10. The computer of claim 1, wherein the respective regions have preset positions in the image frame relative to the respective radar pixels.

11. The computer of claim 10, wherein the respective regions are preset shapes in the image frame, and the preset shapes have a greater height than width.

12. The computer of claim 10, wherein the respective regions are preset shapes in the image frame, and the preset shapes extend a greater distance vertically upward than downward from the radar pixel.

13. The computer of claim 1, wherein the instructions further include instructions to, for the respective regions, upon the greatest association score being below a threshold association score, refrain from calculating the full velocity of the respective radar pixel.

14. The computer of claim 1, wherein, for the respective regions, calculating the full velocity of the respective radar pixel is performing a closed-form calculation.

15. The computer of claim 1, wherein the full velocities of the radar pixels are calculated using only the radar data and the camera data.

16. The computer of claim 1, wherein the first camera pixel is at an updated location in the image frame from a location to which the radar pixel was mapped in the image frame.

17. The computer of claim 1, wherein the radar data are single-row data, and the radar data are sparser horizontally than the camera data are.

18. A method comprising:
receiving radar data from a radar, the radar data including a plurality of radar pixels having respective radial velocities;
receiving camera data from a camera, the camera data including an image frame including camera pixels;
mapping the radar pixels to the image frame;
for the respective radar pixels mapped to the image frame, generating a region of the image frame surrounding the respective radar pixel;
for the respective regions, determining association scores for the respective camera pixels in the respective region, the association scores indicating a likelihood that the respective camera pixels correspond to a same point in an environment as the respective radar pixel, wherein determining the association scores includes executing a trained network;
for the respective regions, selecting a first camera pixel of the camera pixels from the respective region, the first camera pixel having a greatest association score of the association scores in the respective region;
and for the respective regions, calculating a full velocity of the respective radar pixel using the radial velocity of the respective radar pixel and a first optical flow at the respective first camera pixel, the full velocity being a combination of the radial velocity and a tangential velocity of the point in the environment;
wherein the trained network is trained by, for the respective radar pixels mapped to the image frame, minimizing an error between a ground-truth velocity of the respective radar pixel and projected full velocities of the respective radar pixel using the respective camera pixels.

19. A computer comprising a processor and a memory storing instructions executable by the processor to:
receive radar data from a radar, the radar data including a plurality of radar pixels having respective radial velocities;
receive camera data from a camera, the camera data including an image frame including camera pixels;
map the radar pixels to the image frame;
for the respective radar pixels mapped to the image frame, generate a region of the image frame surrounding the respective radar pixel;
for the respective regions, determine association scores for the respective camera pixels in the respective region, the association scores indicating a likelihood that the respective camera pixels correspond to a same point in an environment as the respective radar pixel;
for the respective regions, select a first camera pixel of the camera pixels from the respective region, the first camera pixel having a greatest association score of the association scores in the respective region;
and for the respective regions, calculate a full velocity of the respective radar pixel using the radial velocity of the respective radar pixel and a first optical flow at the respective first camera pixel, the full velocity being a combination of the radial velocity and a tangential velocity of the point in the environment;
wherein the radar data are single-row data;
and the radar data are sparser horizontally than the camera data are.

* * * * *